United States Patent
Wang et al.

(10) Patent No.: US 7,203,179 B2
(45) Date of Patent: Apr. 10, 2007

(54) METHOD AND APPARATUS FOR NORMALIZING CDMA RAKE OUTPUT

(75) Inventors: Tingwu Wang, Singapore Science Park II (SG); Hiroki Sugimoto, Singapore Science Park II (SG); Ping Xie, Singapore Science Park II (SG)

(73) Assignee: Oki Techno Centre (Singapore) Pte Ltd., Singapore (SG)

( * ) Notice: Subject to any disclaimer, the term of this patent is extended or adjusted under 35 U.S.C. 154(b) by 1071 days.

(21) Appl. No.: 10/158,187

(22) Filed: May 31, 2002

(65) Prior Publication Data

US 2002/0181432 A1    Dec. 5, 2002

(30) Foreign Application Priority Data

Jun. 4, 2001    (SG) .............................. 200103333-1

(51) Int. Cl.
*H04Q 7/00*    (2006.01)
(52) U.S. Cl. ...................... 370/328; 370/320; 370/331; 370/332; 370/334; 370/335; 370/342
(58) Field of Classification Search ..................... None
See application file for complete search history.

(56) References Cited

U.S. PATENT DOCUMENTS

| 5,041,830 | A | | 8/1991 | Abe |
| 5,790,705 | A | | 8/1998 | Anderson et al. |
| 5,796,757 | A | * | 8/1998 | Czaja .......................... 714/789 |
| 6,661,835 | B1 | * | 12/2003 | Sugimoto et al. ............ 375/148 |

* cited by examiner

*Primary Examiner*—Chi Pham
*Assistant Examiner*—Raj Jain
(74) *Attorney, Agent, or Firm*—Venable LLP; Michael A. Sartori

(57) ABSTRACT

A technique is proposed for normalizing the multi-bit output of a RAKE receiver by automatically selecting from it fewer bits which are representative of the data in the CDMA signal. The invention is applicable to a CDMA signal in which the data is transmitted discontinuously and a pilot symbol is inserted into the data sequence and transmitted at a different power level. The proposed technique may be operated either on the basis that the power ratio of the pilot part of the CDMA signal to the data part is known, or alternatively without any knowledge of this power ratio. In both cases the pilot part is used to determine the bit position on which the normalization works, and also the fine adjustment of the data part of the CDMA signal.

13 Claims, 9 Drawing Sheets

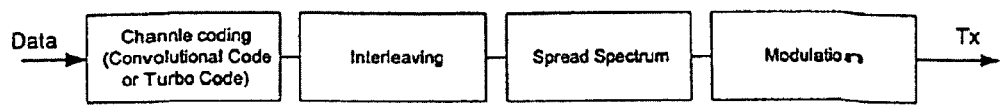
Figure 1 – Prior Art
Figure 2 – Prior Art
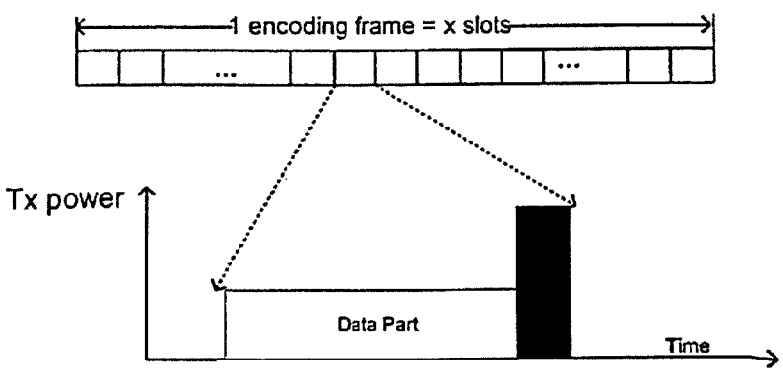
Figure 3

METHOD AND APPARATUS FOR NORMALIZING CDMA RAKE OUTPUT

FIELD OF THE INVENTION

Methods and devices are presented for normalising the output of a RAKE receiver, that is deriving from the multi-bit output of the RAKE receiver a smaller number of bits (e.g. 4 or 6) representative of the data transmitted in a CDMA.

BACKGROUND OF THE INVENTION

In a conventional wireless CDMA (code division multiple access) system, data to be transmitted is encoded to add redundant information using a channel code, such as one of the types commonly referred to as convolutional code or turbo code. Subsequently, an interleaver is used to pseudo-randomly interleave the data sequence to combat the known problem of channel fading to the down link channel. A section of the data which is interleaved in this way is called a "frame". Subsequently the data is subject to a known spread spectrum process. Finally the data is modulated and transmitted. This process is shown as FIG. 1.

A known receiver for the CDMA signal is shown in FIG. 2. The received data is quantized by an AND converter, de-spread with local pseudo-noise ("PN") code in a RAKE receiver (that is to say a known unit which permits a given receiver to distinguish signals intended for it from signals intended for other receivers; typically, a RAKE receiver includes multiple "fingers, and the RAKE receiver is capable of receiving multiple signal sources and adding them together using respective fingers). The RAKE output data for the whole of a frame to be de-interleaved is stored in memory, and then processed to de-interleave it. The de-interleaved data is then used by a Viterbi or turbo decoder to retrieve the transmitted data.

The range of a RAKE output depends on the transmitted signal power strength, the path loss, the fading environment, the spreading gain, the AGC (automatic gain control) and the power control (if any). Therefore, the RAKE receiver will have many bits of output and the valid signal range will vary. However, it is at least highly inconvenient for the ASIC (application specific integrated circuit) to store all the bits of the RAKE output. For this reason, a normaliser is provided for "normalising" the output of the RAKE receiver, by which is meant automatically selecting from the multi-bit output fewer bits which actually contain the desired data. That is, the normaliser aims to reduce the bit width without degrading the performance of the Turbo decoder.

SUMMARY OF THE INVENTION

The present invention aims provide a new and useful method and apparatus for normalising the output of a RAKE receiver. As explained here in detail, the invention is particularly applicable to a CDMA signal, such as WCDMA, in which the data is transmitted discontinuously and a pilot symbol is inserted into the data sequence and transmitted at a different power level. However, although not explained here in detail, the invention is also applicable in any CDMA signal having a pilot, such as a CDMA signal having a shared pilot channel.

In general terms, the present invention proposes that the normalization uses the pilot to dynamically extract a smaller number of bits from the multi-bit output of a RAKE receiver. Since the pilot signal is used for this purpose, the present invention may at least partially overcome any inaccuracy due to the data being in a DTX (discontinuous transmission) mode.

This invention may be operated either on the basis that the power ratio of the pilot part of the CDMA signal to the data part is known, or alternatively without any knowledge of this power ratio. In both cases the pilot part is used to determine the bit position for the normalisation, and also the fine adjustment of the data part of the CDMA signal.

BRIEF DESCRIPTION OF THE DRAWINGS

Embodiments of the invention will now be described for the sake of illustration only with reference to the accompanying drawings, in which:

FIG. 1 shows as a block diagram the structure of a known system for transmitting CDMA signals;

FIG. 2 shows as a block diagram the structure of a known receiver for CDMA signals employing a normaliser for normalising the output of the RAKE receiver;

FIG. 3 shows a possible structure of the encoding frame of a CDMA signal transmitted by the transmitter of FIG. 1;

DETAILED DESCRIPTION OF THE EMBODIMENTS

Referring firstly to FIG. 3, the structure is shown of one frame of the output of the interleaver unit of FIG. 1. This is the same structure as the output of the RAKE receiver in FIG. 2. The frame consists of x slots. Each slot of the CDMA contains a data part and a Pilot part. The transmission powers of these two components are shown as Tx as the vertical axis of the graph of FIG. 3, so that the relative heights ratio $A_{data}$, $A_{pilot}$ of the pilot part and data part of the CDMA signal give the power ratio $A_{data}/A_{pilot}$.

Figure 4:
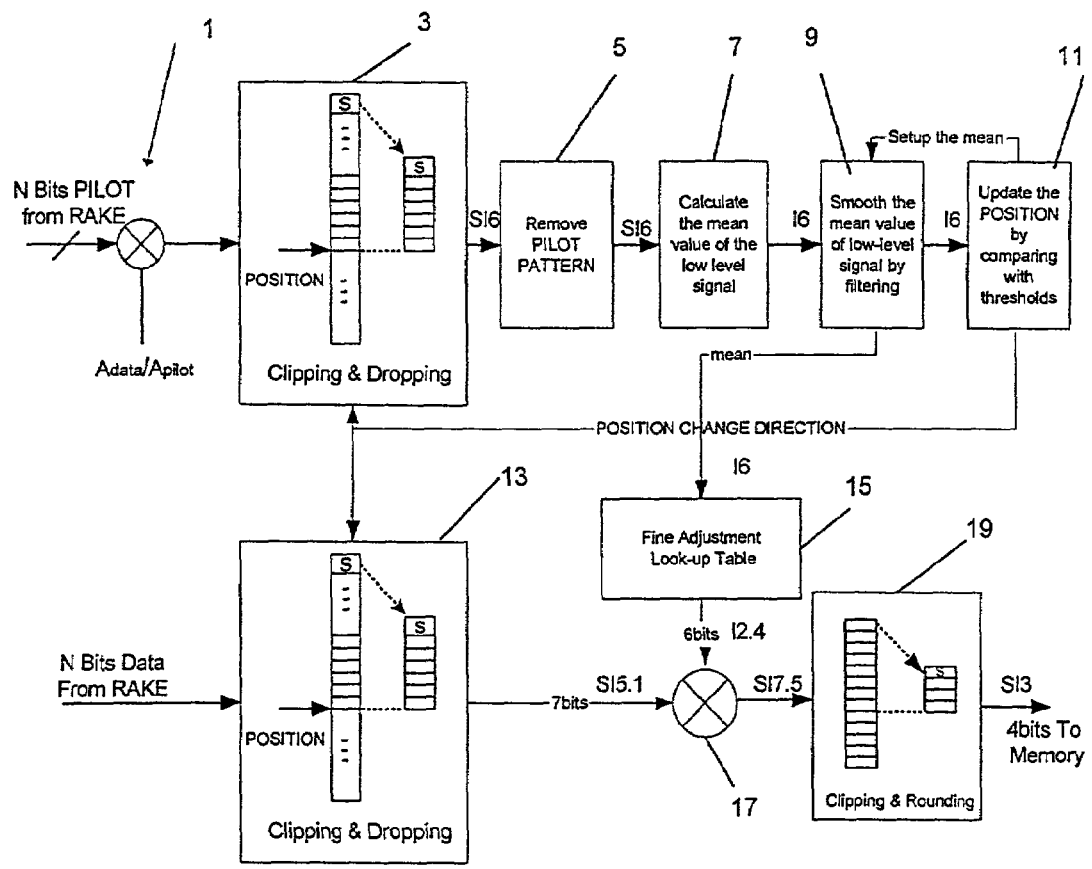
FIG. 4 shows a normaliser which is a first embodiment of the present invention.

FIG. 4 shows the structure of the normaliser which is the first embodiment of the present invention. The first embodiment is preferred in the case that the power ratio of the pilot part and data part of the CDMA signal is known, by measurement of otherwise. The upper part of FIG. 4 consists of components to deal with the pilot part while the lower part of FIG. 4 consists of components to deal with the data part which the normaliser of FIG. 4 normalizes to 4 bits to be stored in the memory. Each of the components is indicated by in FIG. 4 by a respective block captioned with the function of the component.

SI6 means a signal having one sign bit and 6 information bits. I6 means a signal with 6 information bits. SI5.1 means a signal with one sign bit, 5 information bits and one bit below the decimal point. I2.4 means two information bits and four bits below the decimal point. SI7.5 means one sign bit, seven information bits and 5 bits below the decimal point. SI3 means one sign bit and 4 information bits.

The upper part of FIG. 4 receives as input N bits of the PILOT part of the CDMA signal from the RAKE receiver. A multiplier 1 multiplies this by the power ratio so that the pilot part has the same power as the data part. Initially, the variable POSITION is initialised to a pre-set value, although this is subsequently adjusted as explained below. According to the given POSITION the block 3 takes 7 bits of the multi-bit RAKE output by clipping and rounding (also known as "dropping"). The function performed by the unit 3 is here called "Pilot Coarse Adjustment". The POSITION is the least significant bit (LSB) of output of the unit 3 in FIG. 4, which is not the LSB for the input signal of the unit 3. The POSITION selects an output 6+1 (6 bits above the POSITION and 1 bit sign) bit signal from the input signal which has a wider bit width than 7. In block 5, the known pilot pattern is used to remove the modulated pilot signal from the output of the Pilot Coarse Adjustment. This is done with a multiplication.

The resultant pilot signal is used by unit 7 to obtain a mean value of the signal amplitude. Although the transmitted CDMA signal is power-controlled, the received CDMA signal is still affected by fading and fluctuation. A bigger signal means a bigger instantaneous SIR (signal-to-interference ratio) of the signal and a smaller signal means a smaller instantaneous SIR of the signal. The errors occur at the smaller signal with more probability, and the number of bits of the input signal to the Viterbi or Turbo decoder may not provide the whole dynamic range for such a fluctuating signal. Accordingly the normalizer makes more relatively minor modifications to small signals and performs much more clipping on bigger signals. In some other cases such as perfect power control, slow fading and a pure AWGN environment, there are smaller fluctuations of the signal amplitude and the difference of amplitude between bigger signals and smaller signals is insignificant. The mean of the smaller signals is then close to the mean of all the signals. In order to cover these two cases, the present invention proposes using the smaller signals as the reference of the signal amplitude.

The data in one Turbo (or convolutional) encoding frame is de-interleaved by the channel interleaver and for a turbo decoder the data is also interleaved or de-interleaved by an internal interleaver inside the turbo code. In order to get the good performance, all the data should be normalized by the same "coarse adjustment" and the "fine adjustment". Therefore, the adjusting duration—that is the interval between changes in the value of POSITION and the interval between changes in the output of the fine adjustment table—should be the maximum of the channel interleaver size and decoding frame.

For a WCDMA system, there are up to eight (8) encoding frames per channel interleaver. In each encoding frame, there are 15 slots consisting of data part and pilot part. The mean measurement in a WCDMA system is performed as follows:

1. For each encoding frame, we measure the mean value of pilot signal for the first eight slots, labelled Slot 0, Slot 1, . . ., Slot 7 and also measure the mean value of the pilot signal for the last eight slots, labelled Slot 7, Slot 8, . . . , Slot 14, thus two measurements are taken.

2. We repeat the above two measurements for the other 7 frames and finally get 16 measurements.

3. We choose the minimum of these 16 measurements as the mean value output from unit 7.

Figure 5:
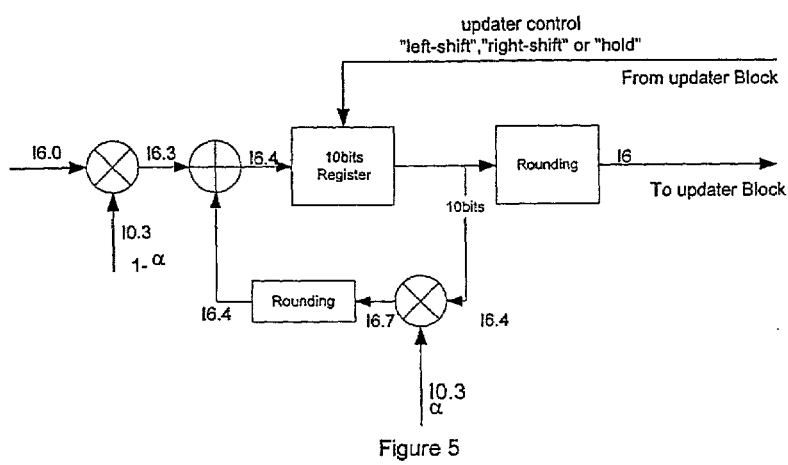
FIG. 5 shows the structure of a filter in the embodiment of FIG. 4.

The mean value is smoothed by an IIR (Infinite Impulse Response) filter 9, which has the structure shown in FIG. 5. Since there is no buffer for the full length of the RAKE output, the mean measurement and the normalization process are simultaneously performed. The mean measurement cannot be used for the frame at which it is being measured. The amplitude of the signal may vary frame by frame. Therefore, the invention proposes using the IIR filter 9 to smooth the mean measurement, according to a formula.

$$y(n)=\alpha y(n-1)+(1-\alpha)x(n)$$

where, $0<\alpha<1.0$. "n" labels sets of 8 frames, so $x(n)$ only changes once every 8 frames. The smoothing factor $\alpha$ is chosen to be 0.625.

The output of the IIR filter 9 is used as a signal amplitude reference by the updater block 11 to perform Pilot Coarse Adjustment in unit 3 and "Data Coarse Adjustment" (defined below) in unit 13, and (as explained below) by the look-up table 15 which produces an output for the "Data Fine Adjustment" (defined below).

Figure 6:
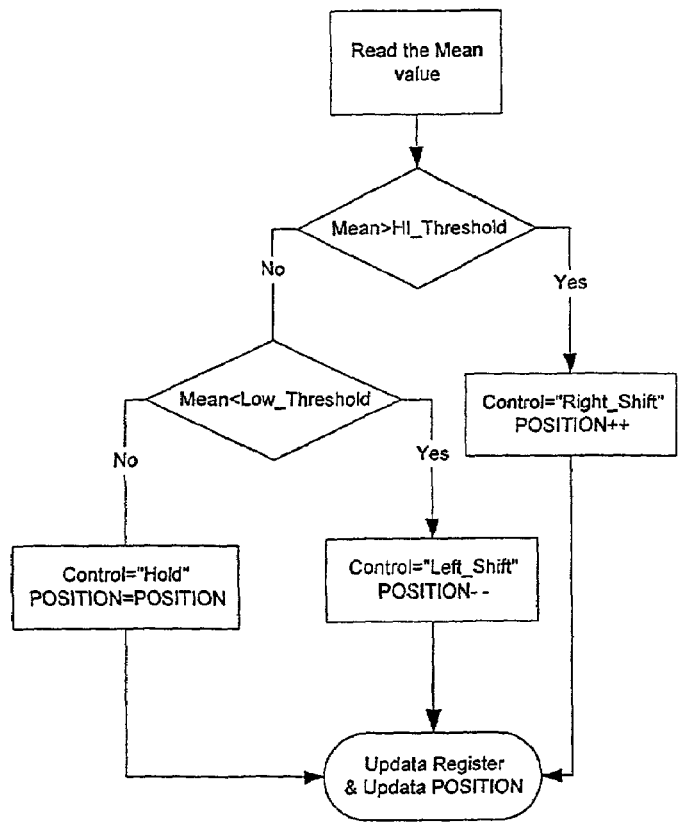
FIG. 6 is a flowchart showing how the embodiment of FIG. 4 performs updating of the position.

The updater block 11 decides if the POSITION should be increased, reduced by 1 or held at the present value. The adjustment step is preferably only 1 bit. The block 11 decides which of the three options (increasing or decreasing POSITION by 1 bit, or keeping the current position) to take by comparing the mean value from the IIR filter 9 with the two pre-set thresholds, named "LOW_Threshold" and "HI_Threshold". Once the position is changed, the measured mean value stored in the registers of the IIR 9 should be doubled or halved accordingly. It is worth noting that all the adjustment is preferably aligned on the edge of the channel interleaving frame, so that all data in one turbo code frame is adjusted by the same weight. The flowchart of the adjustment performed by block 11 is given in FIG. 6.

The lower part of FIG. 4 describes the normalization process of the data part of the RAKE output. Firstly, "Data Coarse Adjustment" is performed by unit 13, thereby taking 7 bits by clipping and rounding according to the same POSITION as that used by unit 3.

The Data Coarse Adjustment is followed by Data Fine Adjustment using the multiplier 17 which adjusts the signal according to the current signal amplitude. Specifically, to ensure that the mean absolute value of the output 4 bits is a fixed "target" value, e.g, the half of the full range, we use the measured mean value to normalize the data part. In principle this could be done by dividing the output of the block 13 by the output of block 9 and multiplying it by the target value. However, to avoid the division this this implies, a look-up-table 15 is used to generate the fine adjustment value input, and sends it to a multiplier 17.

The output of the lookup table for any possible input (i.e. any table address) may be generated by the following C code.

For (Address=0;Address<63;Address++)
{
  if(Address==0) Output[1]=(int) (16.0*TARGET/1+0.5)
Output[Address] =(int)(1 6.0*TARGET/Address+0.5);
if(Output [Address]>63) Output[Address]=63;
}

After "coarse" and "fine" adjustments, the number of bits of the data signal will is tailored to 4 by the last block 19 which applies clipping and rounding. Specifically, the output of block 19 is the 4 bits from the 6th bit to 9th bit of the 13 bits output by the multiplier 17 indexed from 0th.

The resultant signal with 4 bits will be stored into memory. After channel de-interleaving, the data can be used by the Viterbi or turbo decoder.

Figure 7:
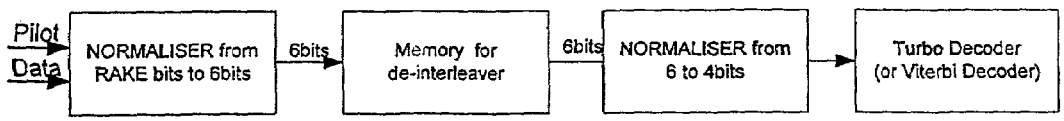
FIG. 7 shows the structure of a receiver according to a second embodiment of the present invention.

We now turn to a second embodiment of the invention illustrated in FIG. 7, which is preferred in the case that the power ratio is unknown. Here, we assume the power ratio may vary from 0 dB to 6 dB. As shown in FIG. 7, this normaliser has a structure comprising a first normalizer which normalises the RAKE output to 6 bits, and a memory which stores these 6 bits. After channel de-interleaving (and optionally other processes) the second embodiment uses a second normalizer to convert the 6 bits data to 4 bits. The 4 bits are then transmitted to a Turbo decoder (or Viterbi decoder). All the processes are independent of the power ratio.

Figure 8:
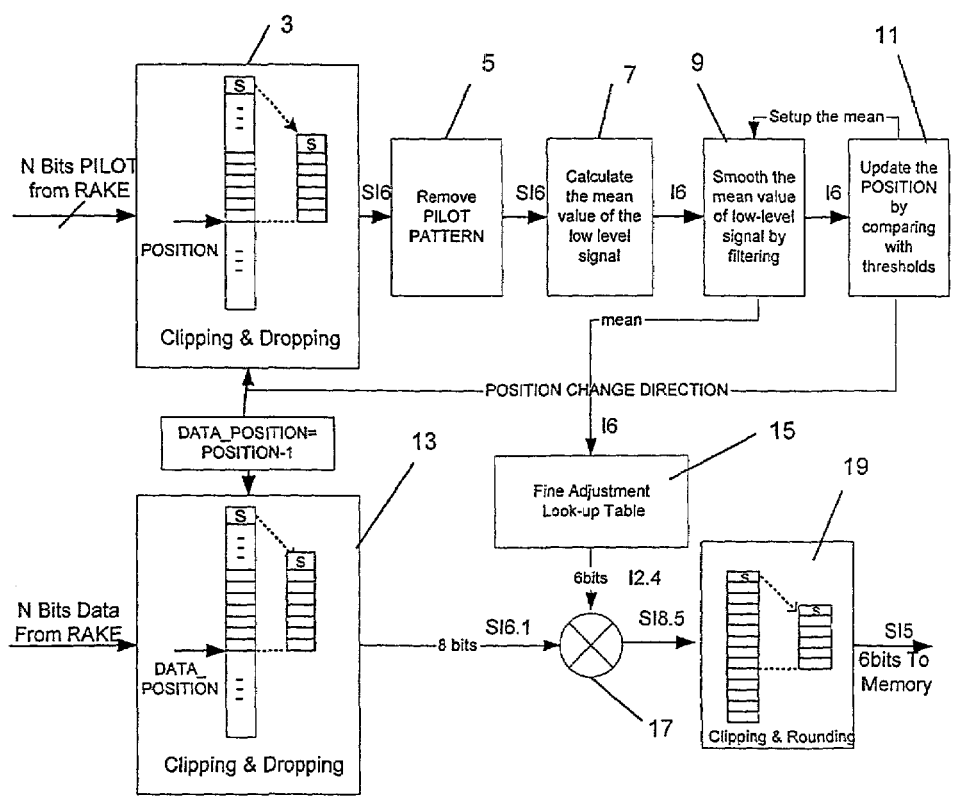
FIG. 8 shows the first normaliser of FIG. 7.

The first normalizer is shown in FIG. 8, and is quite similar to the normalizer shown in FIG. 4. For this reason corresponding portions are given the same reference numerals and are not described in detail again. Compared with the normalizer of FIG. 4 which converts the input data to 4 bits, normalizer of FIG. 8 has the following differences:

1. There is no Amplitude Conversion Block 1 which uses the power ratio to make the pilot have the same amplitude as the data part.
2. The DATA_POSITION is 1 bit lower than Pilot POSITION.
3. The Data Coarse Adjustment is to take 8 bits instead of 7 bits.
4. The Data Output part has an output of 6 bits instead of 4 bits.

The intention of this variation is to use a wider output bit width than in the previous method. As we have chosen 6 bits as the output, we extended the bit width of the calculation to decide the output bits. From a performance point of view, 6 bits of output are suitable, though the memory size has to be large. We assumed that there is some relationship between the known fixed or same power ratio, and the 4 bits or 6 bits (wider or higher performance), and used a 6 to 4 bits converter after the de-interleaver.

Figure 9:
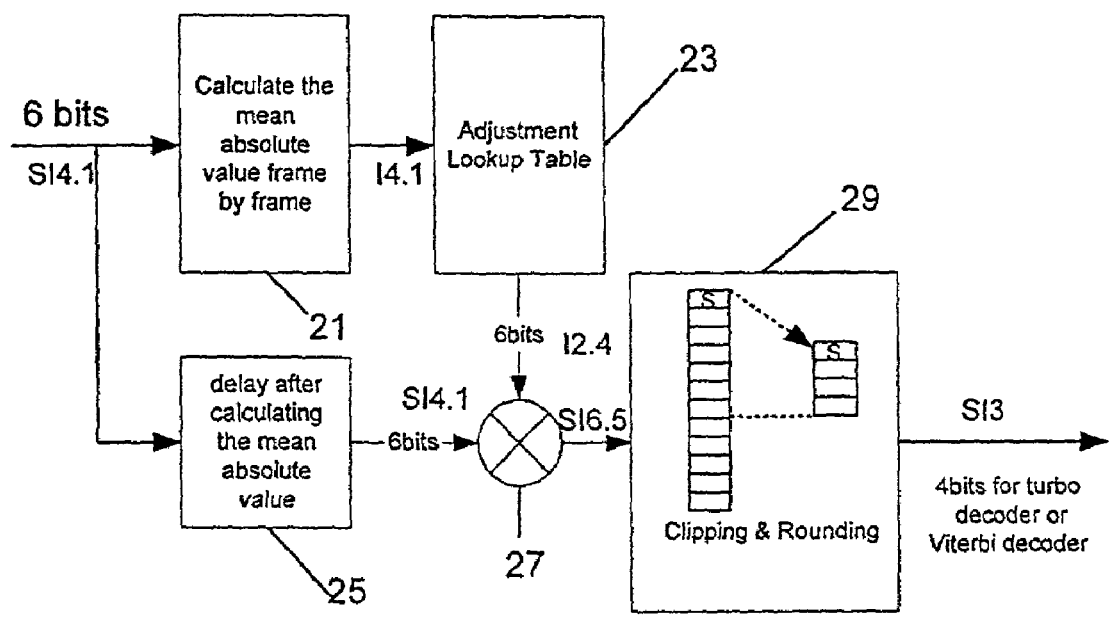
FIG. 9 shows the second normaliser of FIG. 7.

The second normalizer, which converts from 6 bits to 4 bits, is illustrated in FIG. 9. It comprises a mean calculation block 21 which calculates the absolute mean value of the data in one frame, a unit 25 for providing a delay, an adjustment block 23 which outputs a value (the "fine adjustment coefficient") to a multiplier 27 which accordingly adjusts the 6 bit data from the unit 25, and an output block 29.

The mean calculation block 21 measures the absolute value of the data in one turbo code (or convolutional code) frame. Due to the fact all the data are stored in the memory, the measurement value can be applied to the current frame, which is different from the first normalizer of FIG. 8.

This adjustment block 23 is constituted by a look-up-table which is used to get the fine adjustment coefficient. The lookup table can be obtained by the following C code.

For (Address=0;Address<31;Address++)
{
if(Address==0) Output[l]=(int) (16.0*TARGET/1+0.5)
Output[Address]=(int)(16.0*TARGET/,Address+0.5);
If(Output [Address]>63) Output[Address]=63;
}

The output part 29 outputs 4 bits which are the 6th bit to 9th bit of the 12 bits input to it indexed from 0th. Clipping (limitation) and rounding (dropping) are applied in this block.

In order to investigate the performance the invention achieves, we simulated the BER (Bit Error Rate) performance of turbo code with SubMap decoding under the fading environment as well as AWGN environment. The simulation results are as shown in FIGS. 10(a) to (f), where Eb/No (energy per information bit/noise) corresponds to the signal to noise ratio.

Figure 10A:
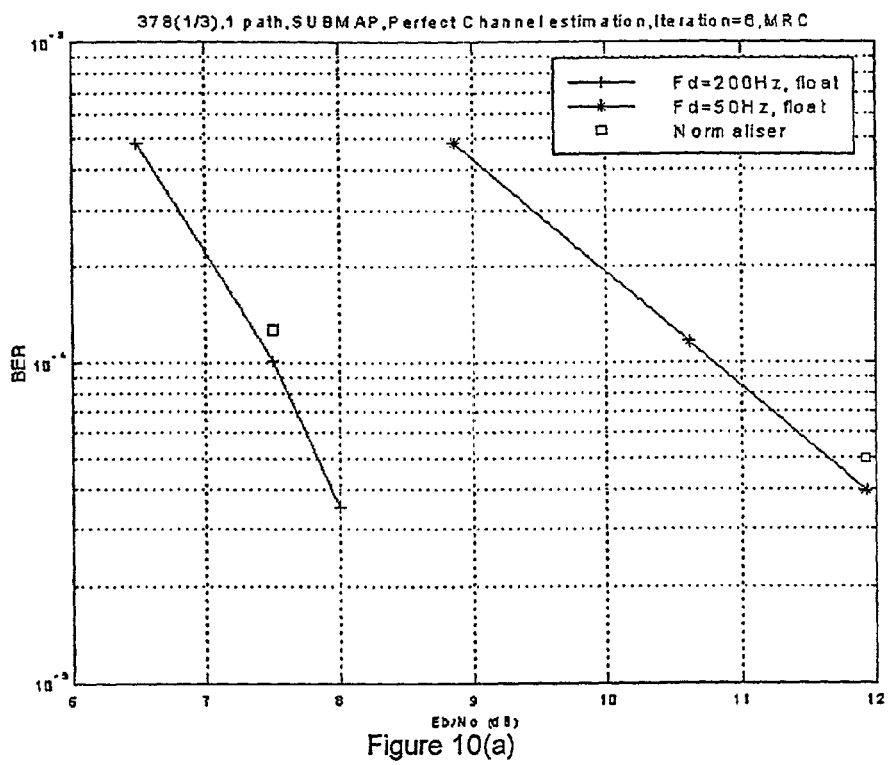
FIG. 10, which consists of FIGS. 10($a$) to 10($f$), demonstrate the effectiveness of a normaliser according to the present invention.
Figure 10B:
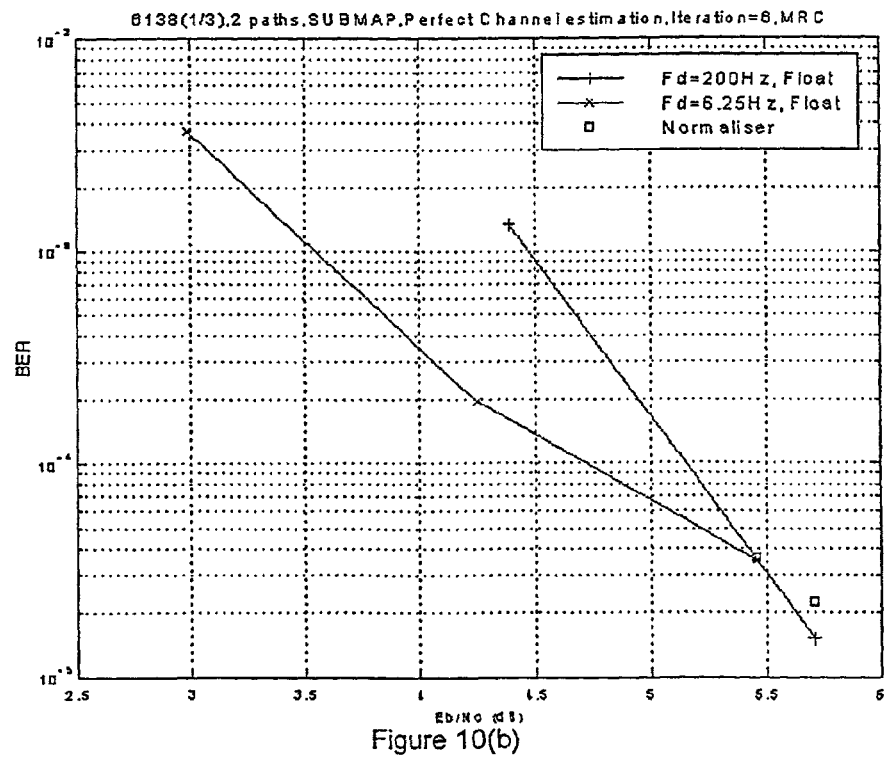
Figure 10C:
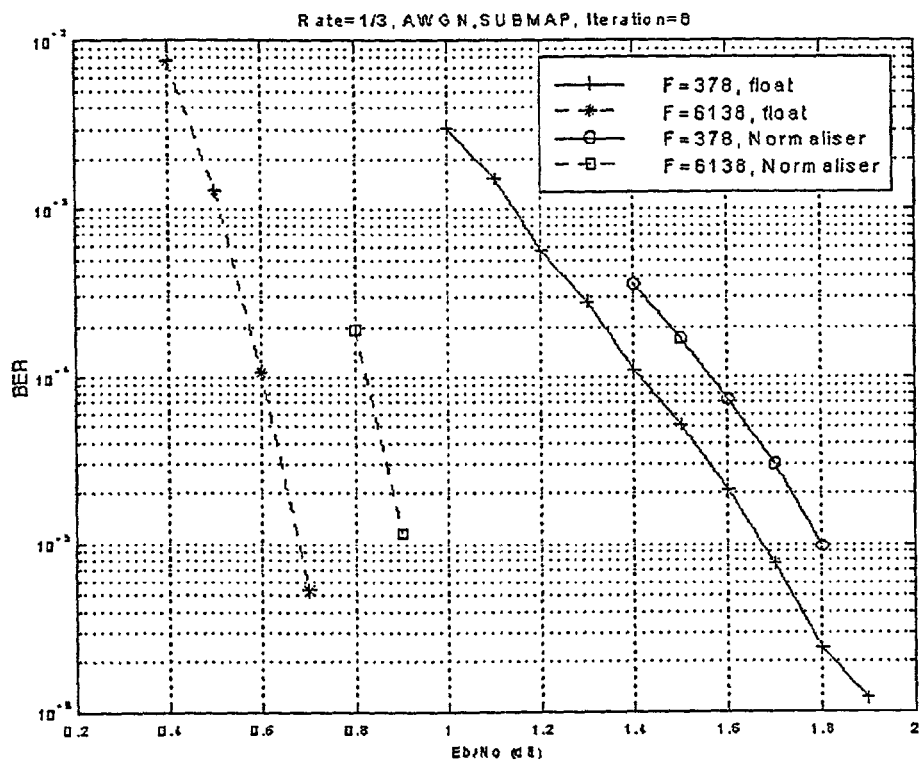

FIGS. 10(a) to 10(c) are in the case of a known power ratio (the first embodiment). FIG. 10(a) is the BER performance in the case of F=378 (where F is the frame length, in this case the Turbo frame length) and rate ⅓ in a fading environment. FIG. 10(b) is the BER performance for F=6138 and rate ⅓ in a fading environment. FIG. 10(c) is the BER performance in a AWGN (additive white Gaussian noise) channel.

Figure 10D:
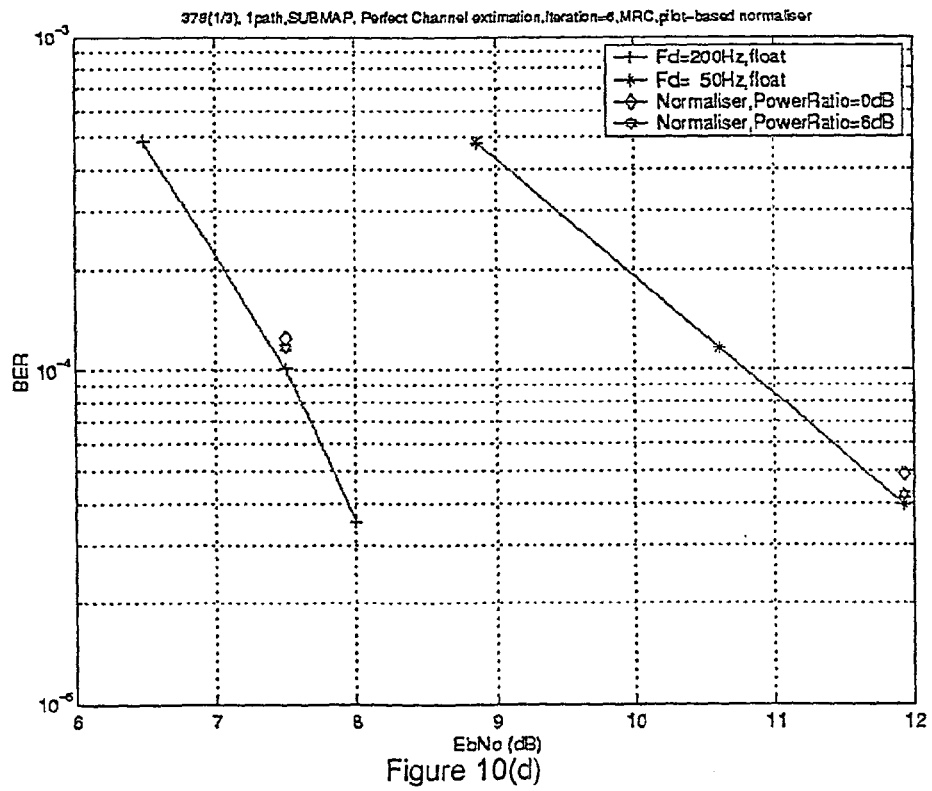
Figure 10E:
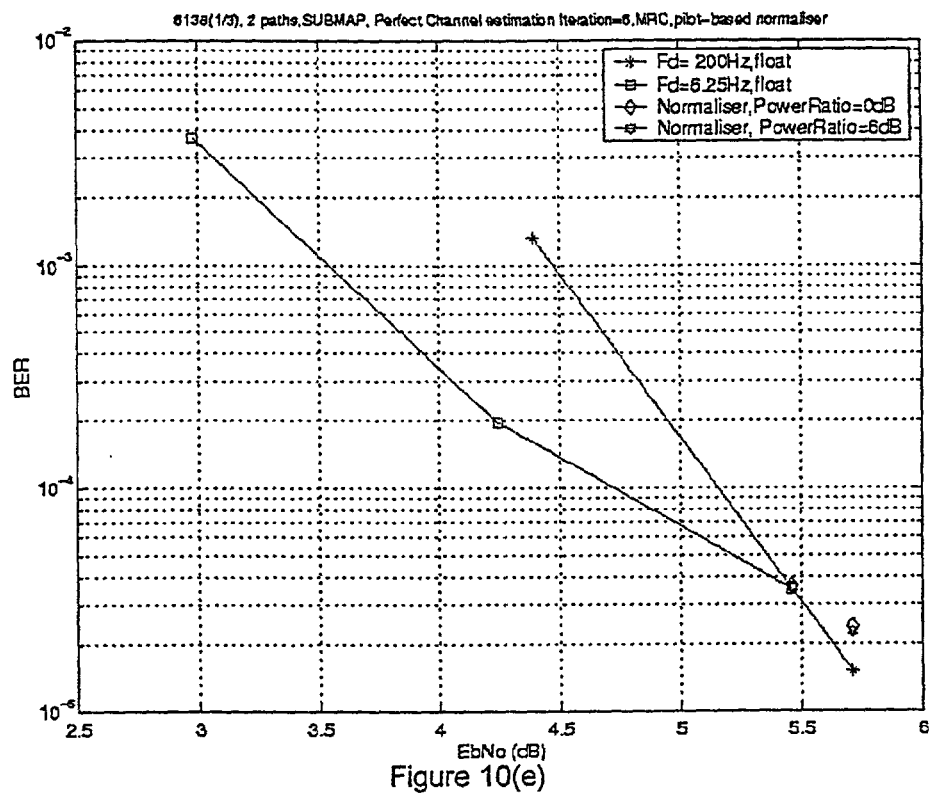
Figure 10F:
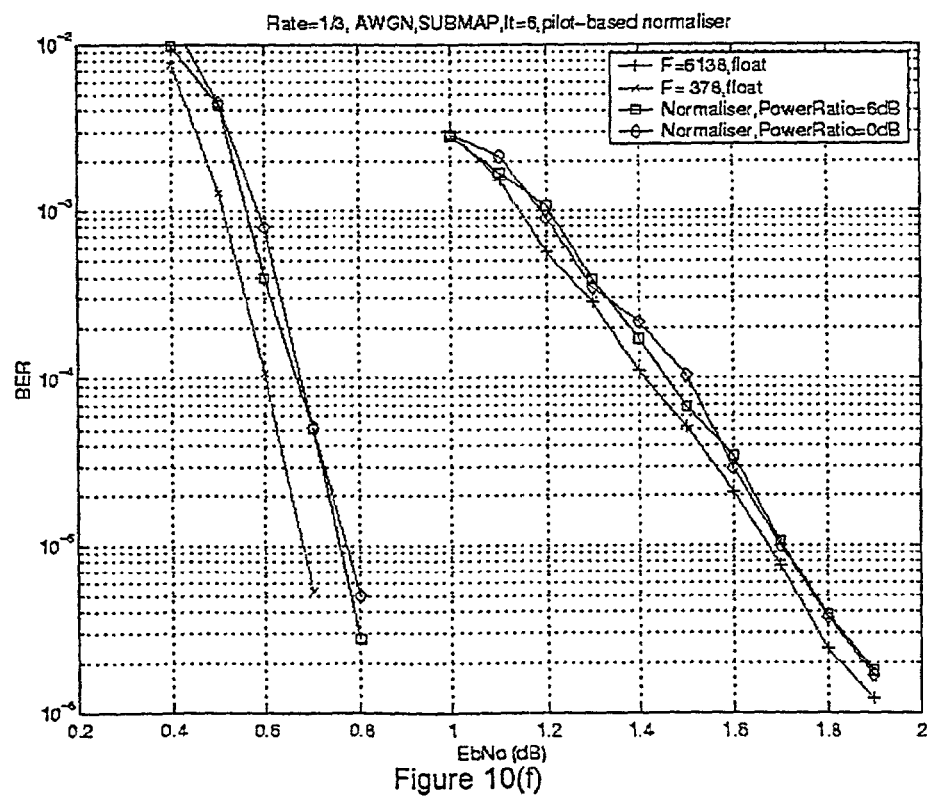

FIGS. 10(d) to 10(f) are in the case of an unknown power ratio (the second embodiment). FIG. 10(d) is the BER performance in the case of F=378 and rate ⅓ in a fading environment. FIG. 10(e) is the BER performance for F=6138 and rate ⅓ in a fading environment. FIG. 10(f) is the BER performance in a AWGN (additive white Gaussian noise) channel.

All these figures compare an embodiment of the present invention against a notional receiver using a floating point calculation. These results show that a normaliser according to an embodiment of the present invention can perform well in both the AWGN and the fading environments. The difference in performance between the present normaliser and the floating point simulation is almost zero.

The invention claimed is:

1. A method for use in a CDMA receiver of the type in which a CDMA signal, including at each of a number of time slots data and a pilot signal modulated together by a spread-spectrum process, is despread by a RAKE receiver to generate a data portion and a pilot portion for each slot,
the method receiving an output of the RAKE, the output of the RAKE including first data which represents the data portions, the method using the first data to extract second data which has fewer bits than the first data and which represents the data portions,
the method including a first normalization process having the steps of:
using the pilot portions to derive a data normalization position and a normalization value;
using the normalization position to extract third data from the first data, the third data having fewer bits than the first data;
adjusting the third data using the normalization value to obtain fourth data; and
extracting the second data from the fourth data, the second data having fewer bits than the fourth data.

2. A method according to claim 1 in which the step of deriving the normalization position and normalization value includes:
performing a clipping and rounding operation on the pilot portion based on a pilot normalization position;
removal of the pilot pattern from each pilot portion,
calculation of a mean value;
smoothing the mean value by filtering based on the pilot normalization position
comparing the smoothed value with thresholds to determine whether to modify the pilot normalization position, and if so modifying the pilot normalization position and the data normalization position, and correspondingly modifying the smoothed mean value;
deriving the normalization value from the smoothed mean value.

3. A method according to claim 2 in which the derivation of the normalization value is by examining a look up table which contains for each possible value of the smoothed mean value a corresponding value of the ratio between a target value for the second data and that possible smoothed mean value.

4. A method according to claim 2 in which the mean value is selected to be the lowest mean value among a set of mean values calculated for a respective plurality of samples of the pilot portion during a plurality of frames.

5. A method according to claim 1 in which the data normalization position is re-evaluated every eight frames, on the edge of a channel frame.

6. A method according to claim 1 in which the second data is 4 bits.

7. A method according to claim 2 which includes obtaining the power ratio of the data portion and the pilot portion, and, prior to the step of deriving the normalization position and the normalization value, converting the pilot portion to have the same power as the data portion.

8. A method according to claim 7 in which the data normalization position is the same as the pilot normalization position.

9. A method according to claim 1, further including a second normalization process including the steps of:
  measurement of the absolute value of the second data;
  derivation from the absolute value of a second normalization value;
  adjustment of the second data using the second normalization value to derive adjusted data; and
  extraction from the adjusted data of fifth data having fewer bits than the second data.

10. A method according to claim 9 in which the second data has 6 bits and the fifth data has 4 bits.

11. A method according to claim 9 in which the data normalization position is one bit less than the pilot normalization position.

12. A normalization unit for a CDMA receiver of the type in which a CDMA signal, including at each of a number of time slots data and a pilot signal encoded together by a spread-spectrum process, is despread by a RAKE receiver to generate a data portion and a pilot portion for each slot,
  the normalization unit being for processing an output of the RAKE including first data which represents the data portions and has a first number of bits, to generate second data which has fewer bits than the first data and which represents the data portions,
  the normalization unit comprising:
    derivation means for using the pilot portions to derive a data normalization position and a normalization value;
    data coarse adjustment means for using the normalization position to extract third data from the first data, the third data having fewer bits than the first data;
    data fine adjustment means for adjusting the third data using the normalization value to obtain fourth data; and
    an output unit for extracting the second data from the fourth data, the second data having fewer bits than the fourth data.

13. A CDMA receiver including a normalization unit according to claim 12.

* * * * *